United States Patent
Tong

(10) Patent No.: US 8,268,931 B2
(45) Date of Patent: Sep. 18, 2012

(54) PROCESS FOR CLEANER PRODUCTION OF CHLORINATED RUBBER WITHOUT USING CARBON TETRACHLORIDE AND WATER

(76) Inventor: Bolin Tong, Shanghai (CN)

(*) Notice: Subject to any disclaimer, the term of this patent is extended or adjusted under 35 U.S.C. 154(b) by 78 days.

(21) Appl. No.: 12/992,807

(22) PCT Filed: Jun. 24, 2008

(86) PCT No.: PCT/CN2008/001222
§ 371 (c)(1),
(2), (4) Date: Nov. 15, 2010

(87) PCT Pub. No.: WO2009/140799
PCT Pub. Date: Nov. 26, 2009

(65) Prior Publication Data
US 2011/0071260 A1 Mar. 24, 2011

(30) Foreign Application Priority Data
May 23, 2008 (CN) .......................... 2008 1 0037925

(51) Int. Cl.
*C08C 19/14* (2006.01)
*C08F 8/22* (2006.01)

(52) U.S. Cl. .................. 525/332.3; 525/333.1; 525/356; 34/312; 34/327

(58) Field of Classification Search ............... 525/332.3, 525/333.1, 356
See application file for complete search history.

(56) References Cited

U.S. PATENT DOCUMENTS

| 1,544,532 A | * | 6/1925 | Ellis ............................. 525/356 |
| 3,677,321 A | | 7/1972 | Felstead |
| 5,378,766 A | * | 1/1995 | Ito et al. ..................... 525/333.8 |

FOREIGN PATENT DOCUMENTS

| CN | 1974606 A | 6/2007 |
| GB | 609154 A | 9/1948 |
| JP | 60065065 A | 4/1985 |

* cited by examiner

*Primary Examiner* — Roberto Rabago
(74) *Attorney, Agent, or Firm* — Mann Li; Mei & Mark LLP

(57) ABSTRACT

The present invention relates to a green technology to produce chlorinated rubber without using carbon tetrachloride and water by using 1,1,2-trichloroethane as the solvent and iodine as the catalyst. The natural rubber reacts with an excessive amount of gaseous chlorine at 60-100° C. for 3-8 hours and the product is then dried. The method of the present invention complies with the environmental requirements of "The Montreal Protocol on Substances that Deplete the Ozone Layer" by abandoning the usage of $CCl_4$. It also complies with the relevant regulations regarding ship-shell paints. Moreover, it is easy to carry out and is suitable for industrialization.

6 Claims, No Drawings

PROCESS FOR CLEANER PRODUCTION OF CHLORINATED RUBBER WITHOUT USING CARBON TETRACHLORIDE AND WATER

CROSS-REFERENCE TO RELATED APPLICATIONS

The subject application is a national stage of PCT/CN2008/001222 filed on Jun. 24, 2008 and claims priority on Chinese application no. 200810037925.8 filed on May 23, 2008. The contents and subject matter of the priority applications are incorporated herein by reference.

TECHNICAL FIELD

The present invention relates to a green technology to produce chlorinated rubber without using carbon tetrachloride and water. The method of the present invention does not involve using water, which avoids discharging waste water. The three kinds of waste gas which have been produced or discharged during the production can be recovered or can be used to produce two by-products, respectively, so that the production of the present invention can eliminate waste materials. More importantly, not only the products meet the requirements for their intended uses, but also the production method complies with the environmental requirements of "The Montreal Protocol on Substances that Deplete the Ozone Layer" which forbids and limits the usage of $CCl_4$.

BACKGROUND OF THE TECHNOLOGY

Chlorinated rubber is a polychlorinated natural rubber and a chlorinated isoprene. It is an organic polymer compound mixture of tri- and tetra-chlorinated rubber with a molecular weight of 30,000-300,000. The viscosity, stability, durability, and gloss-retaining quality increase when the molecular weight increases. Moreover, the rubber is easier to paint. The solubility and the volatility also increase. In contrast, when the molecular weight decreases, the viscosity decreases correspondingly, so do the stability, durability, and gloss-retaining quality of the rubber.

Chlorinated rubber has stable characteristics in the form of a white or yellowish fluid powder. It is soluble in benzene, toluene, carbon tetrachloride, and other aromatic solvents as well as esters and ketones, and forms a yellowish transparent solution. The solution formed has an extremely good film-forming ability and unique anti-friction and adhesive characteristics; in the meantime, the solution has superior weathering resistance, heat resistance, insulation, chemical corrosion resistance, acid and alkali resistance, saline-alkali resistance, and anti-mold characteristic. The material is mainly used for manufacturing the paint, adhesive, and ink. It is the film-forming matrix of the paint.

The industrialized production of the chlorinated rubber has a history of more than 70 years. It can be used to produce high building coating. Together with the airless high pressure paint technology, the application of the chlorinated rubber has rapidly been developed.

Due to the superior water, acid, alkali, and corrosion resistance of the chlorinated rubber and the fact that it is quick to dry and convenient to use, chlorinated rubber can be painted on a vast area no matter it is chilly in the north (at the temperature below −30° C.) or it is hot in the south (at the temperature above 60° C.). It has widely been utilized as anti-corrosion and anti-fire paint for submarines, cruises, big ocean vessels, big undersea steel constructions, bridges, nuclear power station, aerospace vehicles, containers, and signposts. Until now there is no other corrosion resistant paint which can replace chlorinated rubber.

To manufacture chlorinated rubber, the solvent water-resolving method and the solvent exchange method are the only methods which have been used both domestically and abroad, and these methods both utilize carbon tetrachloride as the solvent. Chlorinated rubber products are nontoxic, odorless, and harmless to the environment and to the human body. The only reason why the production of chlorinated rubber has encountered restriction and has to be stopped is solely that the carbon tetrachloride being used destroys the ozone layer.

The United Nations Environment Program has stipulated "The Montreal Protocol on Substances that Deplete the Ozone Layer" in 1987, which requested to phase out the production of the substances believed to be responsible for ozone depletion and set out timeline for the discontinuation of the usage of such substances. It has undergone revision in the meeting in London on Jun. 29, 1990 (the revision is called "London Adjustments and Amendments"). It came into force formally on Aug. 10, 1992. The State Council of China issued "The Chinese Program of Gradual Phasing out Ozone Depleting Substance", which explicitly commanded relevant industries to set up plans and goals to gradually reduce and then to stop the production and usage of ozone depleting substances. $CCl_4$ is classified in Annex B of the "London Adjustments and Amendments" as the second group of substances which need to be controlled. It is agreed that developed countries have to stop using and producing the ozone depleting substances by Jan. 1, 2000 and developing countries by Jan. 1, 2010. As a result, the utilization of the conventional carbon tetrachloride solvent water-resolving method has been or is facing being stopped.

There are only a few factories left now in China which are using $CCl_4$ as the solvent to manufacture chlorinated rubber, and these factories will all have to cease using the method before Jan. 1, 2010. In order to make up the loss caused by stopping manufacturing chlorinated rubber, the World Bank compensates each factory with 3,500,000 Chinese Yuan. Shanghai Chloro-Alkali Company has been compensated with 37,500,000 US dollars for stopping the production line with an annual output of 5000 ton $CCl_4$. All the factories in the developed countries which employed $CCl_4$ solvent water-resolving method have stopped production before Jan. 1, 2000. For example, England has disassembled the production line which had an annual production of 12700 ton chlorinated rubber by utilizing $CCl_4$ solvent water-resolving method and moved it to the developing country, India. Only two years remains now before it will also become illegal to produce chlorinated rubber with such method in India. The German company, Bayer AG, utilizes the solvent exchange method to exchange $CCl_4$ with toluene. Due to the low unit consumption, the method is allowed to be used until 2010 with also only 2 years remaining.

After "the London Adjustments and Amendments" came into force, related research institutes and manufacturing factories have been investing heavily in finding new ways to manufacture chlorinated rubber and to find substitutes for the chlorinated rubber.

The substitutes being developed so far are Vinylchloride-Vinylisobutylether copolymer with the brand name of LarofiexMP developed abroad, and trichlorinated polyethylene developed in China. However, the characteristics of these substitutes are no parallel to the chlorinated rubber. Our government supports and encourages developing substitute technology which is compatible with the domestic program to protect ozone layer. Substances other than the seven which are being controlled should be developed to replace $CCl_4$.

DETAILED DESCRIPTION OF THE INVENTION

The object of the present invention is to provide a green technology to produce chlorinated rubber without using carbon tetrachloride and water.

The anhydrous method to produce chlorinated rubber of the present invention should utilize a solvent other than the seven substances which are being controlled to replace $CCl_4$. Such a solvent should meet the following requirements:

It has to be able to completely dissolve natural rubber to form a natural rubber solution.

It has to be able to completely dissolve the chlorinated rubber produced to form a chlorinated rubber solution.

It must not react with the hydrogen chloride produced during the chlorination reaction.

It must not react with chlorine.

The solvent itself must be stable, and does not decompose during the reaction and drying process. It can be recycled and reused with small loss.

The environmentally friendly method of the present invention utilize 1,1,2-trichloroethane as the solvent and iodine as the catalyst. The natural rubber reacts with an excessive amount of gaseous chlorine at 60-100° C. for 3-8 hours and is then dried.

The chlorination reaction time is 3-4 hours and the entrance gauge pressure is higher than 0 and between 0-0.1 MPa.

The product is dried in a sealed container through spray drying or high speed centrifugal spray powder drying. The centrifugal spray powder drying is carried out at the top of the tower, where the high speed centrifugal powder drying method with a rotational speed of 10000-20000 revolutions per minute and a mixture chamber with a temperature of 120-160° C. is used to nebulize the reaction product into small particles, and the chlorinated rubber and the solvent are then recovered, respectively.

Using the method of the present invention, the solvent in the reacted gas is recovered through condensation, hydrogen chloride is absorbed by water and turns into hydrochloric acid and sodium hydroxide is added to turn the remaining chloride into sodium hypochloride.

The method is carried out in a scaled system.

The method of the present invention does not involve using water, which avoids discharging waste water. The three kinds of waste gases which have been produced or discharged during the production can be recovered or used to produce two by-products, respectively. As a result, the current method involves no waste materials and is very environmentally friendly.

The chlorinated rubber produced by the method of the present invention which utilizes 1,1,2-trichloroethane (abbreviated as TR1) as the solvent and the chlorinated rubber produced by using $CCl_4$ (abbreviated as TR2) have been compared by the aluminum powder rust resistant paint test and white finish coat test, and the results show that the characteristics and stability of the chlorinated rubber produced by the method of the present invention reaches the level of the conventional chlorinated rubber. In addition, the chlorinated rubber of the present invention fulfills the GB/T6745 ship-shell paint technical requirements as well as the HG/T2798 anti-corrosion paint requirements.

The production method of the present invention is not only easy to carry out, but also suitable for industrialized production. Moreover, it complies with the environmental requirements of "The Montreal Protocol on Substances that Deplete the Ozone Layer" by abandoning the usage of $CCl_4$. It also complies with the relevant regulations regarding ship-shell paints.

DETAILED EMBODIMENTS

Example 1

Natural rubber is first plasticated via plasticating procedure. 0.3-0.5 ton plasticated natural rubber is added into a dissolving tank in which 10-12 ton TR1 solvent has already been added. The temperature is then raised to 60-100° C. so that the mixture becomes rubber solution. After the rubber is completely dissolved, the solution is pumped into a chlorination reactor, and additional 2-5 ton TR1 solvent is then added. Additional 100-120 kg iodine containing TR1 is added to the solution while the solution is being stirred. Each ton of the TR1 solvent contains 0.08 kg iodine. 1900-2200 kg chlorine gas is added from the bottom of the reactor and the chlorination reaction is carried out for 3-4 hours. The entrance pressure of the chlorine gas is above 0 and between 0 and 0.1 MPa. The reaction is an exothermic reaction, and therefore the temperature within the reactor increases gradually with the temperature being controlled between 60 and 100° C. A large amount of TR1 vapor, hydrogen chloride produced during the reaction and the unreacted chlorine forms exhaust gas and enter altogether into a chlorination condensation system. The TR1 solution in the reactor is named as the chlorinated solution. The exhaust gas leaves the condenser and is directed into a hydrogen chloride circulation and recovery system where the hydrogen chloride is recovered as hydrochloric acid. The exhaust gas is then directed to a chlorine circulation and recovery system where the chlorine reacts with 15% NaOH to form sodium hypochloride. The concentration of unrecovered TR1 vapor, HCl, and $Cl_2$ all reach the discharge standards. The chlorinated solution is pumped into a chlorinated solution storage chamber and is then pumped into the top of the drying tower via a metering pump. The mixed air which enters the tower is kept at a temperature between 120 and 160° C. With a rotational speed of 10000-20000 revolutions per minute together with the heating of the drying air stream which descends from the top of the tower, the chlorinated rubber is nebulized immediately into tiny solid particles. In the meantime, the TR1 is evaporated into vapor, recovered in a dry and sealed recycle system, and is then reused. The solid particles which have left the drying tower are powderized and dried. The 1.6-2 ton finished product of chlorinated rubber is packaged and stored.

The control $CCl_4$ method utilizes $CCl_4$ as the solvent instead of using TR1 as the solvent. The chlorination temperature is 60-75° C. The chlorinated solution is pumped into the top of the drying tower and the temperature of the mixture entered is 110-130° C. The rest of the reaction conditions are identical.

The above two production methods are both carried out in the sealed system.

The products obtained by the above two methods by using TR1 and TR2 have been tested by the Shanghai Institute of Organic Chemistry. Chinese Academy of Sciences, using Infrared spectrometer. The infrared spectrums of the two products are compared with the standard infrared spectrum of the chlorinated rubber product published in the IR spectrum collection by the American Hercules Firm and it turned out that they have basically the same chemical structure, which are both chlorinated rubber.

The two sample products obtained by using TR1 and TR2 have been analyzed by a thermogravimetric analyzer (TGA).

The TGA results showed that these two samples contain very small amount of TR1 and TR2 respectively. In the meantime, it has been found that the sample obtained by using TR2 contains 6.3% more solvent than the sample obtained by using TR1, which means that, when the chlorine content and the weight of the chlorinated rubber are identical, the chlorine content of chlorinated rubber itself obtained by using TR1 is 2% higher. Therefore, the sample obtained by TR1 is more preferred than that by TR2.

Moreover, the solubility of natural rubber in TR1 is twice as much as its solubility in $CCl_4$. The solubility of chlorinated rubber in TR1 is live times as much as its solubility in $CCl_4$. When TR1 solvent is heated to 113-115° C. for 2 hours, it is stable and does not decompose.

Example 2

Test of the Technical Characteristics of Chlorinated Rubber

This is to test whether the chlorinated rubber produced by the new technology without using $CCl_4$ has the same characteristics as the one produced by the method using $CCl_4$. In the tests, the chlorinated rubber produced by using $CCl_4$ has been used as a control sample.

According to the requirements of the chlorinated rubber paint, the conventional characteristics of the two chlorinated rubber have been compared.

(1) Test of the Conventional Characteristics of the Chlorinated Rubber

TABLE 1

Conventional Characteristics Of The Chlorinated Rubber

| No. | Test item | Technical requirement | Test results | | evaluation | Test method |
| --- | --- | --- | --- | --- | --- | --- |
| | | | TR1(new pilot CR) | TR2($CCl_4$ CR) | | |
| 1 | apperance | White powder | Light yellow powder | White powder | qualified | visual |
| 2 | solubility | Clear, no solid particles (20% toluene solution) | Clear, no solid particles | Clear, no solid particles | qualified | KYJ 01 |
| 3 | fineness | ≦40 um(20% toluene solution) | 30 | 30 | qualified | GB/T 1724 |
| 4 | viscosity | 12-15.2 s | 14.9 | 13 | qualified | GB/T 1723.5.3 |
| 5 | Water content | ≦0.3% | 0.3 | 0.35 | qualified | GB/T 606 |
| 6 | Chlorine content | ≧60% | 61.11 | 66.99 | qualified | Shanghai Q/HG6-12 |
| 7 | Thermal stability | ≧20 min (Congo red test paper does not change colour) | Congo red test paper starts to change colour after 70 s, after 20 min, ⅔ has changed colour | Congo red test paper starts to change colour after 70 s, after 20 min, ½ has changed colour | applicable | KYJ 42 |

Note:
the chlorine contents are test data from the company.

(2) Test of the Solubility of the Chlorinated Rubber

The chlorinated rubber is dissolved into dimethylbenzene at a concentration of 40%. The fineness and the solid particle content are tested in order to determine whether it fulfills production requirements.

TABLE 2

Test Of The Chlorinated Rubber Solution

| No. | Test item | Technical requirement | Test results | | evaluation | Test method |
| --- | --- | --- | --- | --- | --- | --- |
| | | | TR1(new pilot CR) | TR2($CCl_4$ CR) | | |
| 1 | fineness | 10 um | 15 | 10 | qualified | GB/T1724 |
| 2 | Solid content | 39.45% | 42.0 | 40.0 | qualified | KYJ 19 |

The data in Table 1 and Table 2 show that the nine conventional characteristics of the chlorinated rubber produced by using TR1 are identical with the chlorinated rubber produced by using $CCl_4$, and it meets the technical requirements for the chlorinated rubber paint production.

Example 3

Test for Paint

According to the application of the chlorinated rubber, the current and traditional $CCl_4$ methods have been used to produce the representative 615 chlorinated rubber aluminum powder rust resistant paint and J43-32 (667) white chlorinated rubber finish coat. The test results of the chlorinated rubber paint are according to the general GB/T6745 shipshell paint technical requirements as well as the HG/T2798 anticorrosion paint requirements.

(1) Chlorinated Rubber Aluminum Powder Rust Resistant Test

The two chlorinated rubber are used together with other identical raw materials respectively to produce chlorinated rubber aluminum powder rust resistant paint. Different samples have been prepared according to different test items. A variety of characteristics as listed in Table 3 have been tested.

TABLE 3

Chlorinated Rubber Aluminum Powder Rust Resistant Test

| No | Item | | Technical Requirements | Test Results | | Evaluation | Test Method |
|---|---|---|---|---|---|---|---|
| | | | | TR1 (New Method CR) | TR2 ($CCl_4$ Method CR) | | |
| 1 | Colour and apperance | | Silvery white | Silvery white | Silvery white | Qualified | Visual |
| 2 | viscosity | | 1.5-4.0 Pa·s | 1.9 | 1.8 | qualified | GB/T 1723.5.3 |
| 3 | Drying time | Surface dry | 25 min | 15 min | 20 min | qualified | GB/T 1728.2(乙) |
| | | Completely dry | 4 h | 3 h | 4 h | qualified | GB/T 1728.3(甲) |
| 4 | Adhesive force | | ≦2 级 | 1 | 1 | qualified | GB/T 1720 |
| 5 | flexibility | | ≦2 mm | 1 | 1 | qualified | GB/T 1731 |
| 6 | thresh resistance | | 50 cm | 50 | 50 | qualified | GB/T 1732 |
| 7 | brine resistance (45 ± 5 um) | | ≧21 d the paint does not fall off, the erroded area is no more than % | 35 d Paint intact | 35 d Paint intact | qualified | GB/T 1763.3(1) |
| 8 | Water resistance (45 ± 5 um) | | ≧21 d the paint does not fall off, bubble or rust | 35 d Paint coating intact | 35 d Paint coating intact | qualified | GB/T 1733 |
| 9 | Salt mist resistance (integrated system) | | ≧200 h the paint does not fall off, bubble or rust | 200 h the paint coating does not fall off, bubble or rust | 200 h the paint coating does not fall off, bubble or rust | qualified | GB/T 1771 |
| 10 | applicability | | No difficulty in spray painting (no obvious fibering, bubbling or sagging) | No difficulty in spraying or brushing | No difficulty in spraying or brushing | qualified | HG/T 2798.4.6 |
| 11 | Storage stability (test temperature 50 ± 2°) | | Control experiment, observe the viscosity change during storage period | After 40 d viscosity 1.84 Pa·s | After 40 d viscosity 1.65 Pa·s | change of viscosity is within normal range | Q/GHTD 96-5, 4 |

In the test, TR1 has higher viscosity and shorter drying time (surface dry and completely dry) than TR2. Storage stability: 50±2° C. for 40 days, TR1 has a smaller change in viscosity than TR2. It suggests that the anti-corrosion paint made of TR1 is better than the one made of TR2. Therefore, TR1 can replace TR2 to produce the chlorinated rubber paint.

(2) Test of the Characteristics of the White Chlorinated Rubber Finish Coat

The two chlorinated rubber are used together with other identical raw materials respectively to produce J43-32 (667) white chlorinated rubber finish coat. Different samples have been prepared according to different test items. A variety of characteristics as listed in Table 4 have been tested.

TABLE 4

Test Of The Characteristics Of The White Chlorinated Rubber Finish Coat

| No | Test item | Technical requirements | Test results TR1 (new method CR) | Test results TR2 (CCl$_4$ method CR) | Evaluation | Test method |
|---|---|---|---|---|---|---|
| 1 | Color and apperance | white, the coating is smooth | white, the coating is smooth | white, the coating is smooth | qualified | visual |
| 2 | viscosity | 1.5-4.0 Pa·s | 3.2 | 2.8 | qualified | GB/T 1723.5.3 |
| 3 | Drying time Surface dry | ≦2 h | 20 min | 20 min | qualified | GB/T 1728.2(乙) |
|   | Completely dry | ≦4 h | 3 h | 3 h | qualified | GB/T 1728.3 |
| 4 | fineness | ≦40 um | 40 | 40 | qualified | GB/T 1724 |
| 5 | Adhesive force | ≦2 级 | 1 | 1 | qualified | GB/T 1720 |
| 6 | flexibility | ≦1 mm | 1 | 1 | qualified | GB/T 1731 |
| 7 | thresh resistance | ≧40 cm | 50 | 50 | qualified | GB/T 1732 |
| 8 | Brine resistance (integrated system) | ≧120 h bubbling area is less than 10% | 600 h no bubbling in the paint coating | 600 h no bubbling in the paint coating | qualified | GB/T 1763.3(1) |
| 9 | Water resistance (integrated system) | ≧21 d the paint does not fall off, bubble or rust | 35 d Paint coating intact | 35 d paint coating intact | qualified | GB/T 1771 |
| 10 | Salt mist resistance (integrated system) | ≧200 h the paint does not fall off, bubble or rust | 200 h the paint does not fall off, bubble or rust | 200 h the paint does not fall off, bubble or rust | qualified | GB/T 1733 |
| 11 | Aging acceleration test (integrated system) | ≧300 h coating changes colour ≦degree 4、powderization ≦degree 3、the paint does not fall off, bubble or rust | 300 h Color change degree 0 ($\Delta E^* = 1.3$) Loss of gloss degree 0 (degree of gloss loss % = 0) Powderization degree 0 Cracking degree 0 | 300 h Color change degree 0 ($\Delta E^* = 1.0$) Loss of gloss degree (degree of gloss loss % = 0) Powderization degree 0 Cracking degree 0 | qualified | GB/T 1766 GB/T 1865 (see test report) |
| 12 | applicability | No difficulty in spray painting (no obvious fibering, bubbling or sagging) | No difficulty in spraying or brushing | No difficulty in spraying or brushing | qualified | HG/T 2798.4.6 |
| 13 | Storage stability (test temperature: 50 ± 2° C.) | Control experiment, observe the viscosity change during storage period | After 40 d viscosity 3.91 Pa·s | After 40 d viscosity 2.70 Pa·s | Viscosity change is within normal range | Q/GHTD 96-5, 4 | note:
the coating thickness of the sample: chlorinated rubber aluminum powder rust resistant paint ≧80 um, finish coat ≧80 um.

(3) Test of the Stability of the Chlorinated Rubber

The storage stability of the chlorinated rubber itself and its paint product is also a very important technical characteristic. Therefore, in the current experiment, the stability of the chlorinated rubber produced by the new method of the subject invention and its paint product has been tested. The thermal stability data obtained by using Congo red listed in item 7 in Table 1 show that the thermal stability of the chlorinated rubber produced by using TR1 is as good as the traditional chlorinated rubber produced by using CCl$_4$.

The more important criterion is that whether the chlorinated rubber paint has a shelf life of one year as stipulated by paint factories. The storage stability of the aluminum powder rust resistant paint and the white finish coat produced by using the two different chlorinated rubber respectively have been tested in the oven with a temperature of 50±2° C.

TABLE 5

Test Of The Storage Stability Of The Chlorinated Rubber

| | Paint Name | | | |
|---|---|---|---|---|
| | Chlorinated Rubber Aluminum Powder Rust Resistant Paint | | White Chlorinated Rubber Finish Coat | |
| | TR1 | TR2 | TR1 | TR2 |
| viscosity (NDJ-1), Pa·s | 1.5-4.0 | | 1.5-4.0 | |
| Initial viscosity, Pa·s | 1.9 | 1.8 | 3.2 | 2.8 |
| 50 ± 2 ☐ thermostatic storage after 40 d viscosity, Pa·s | 1.84 Pa·s | 1.65 Pa·s | 3.91 Pa·s | 2.70 Pa·s |

The paint samples have been stored in the 50±2° C. oven for 40 days. The test data show that the viscosity change of the samples does not exceed standard range. The chlorinated rubber produced by using TR1 is similar to the chlorinated rubber produced by using TR2 in terms of stability.

The chlorinated rubber aluminum powder anti-rust paint and the white finish coat produced by chlorinated rubber manufactured by using TR1 feature same stability and characteristics as the chlorinated rubber manufactured by the traditional $CCl_4$ method. Moreover, they meet the GB/T6745 ship-shell paint technical requirements as well as the HG/T2798 anticorrosion paint requirements.

The invention claimed is:

1. A method for making chlorinated rubber, comprising the steps of
   using 1,1,2-trichloroethane as a solvent and iodine as a catalyst,
   reacting natural rubber with an excessive amount of gaseous chlorine at 60-100° C. for 3-8 hours in presence of the 1,1,2-trichloroethane and iodine, and
   drying a product of the reaction.

2. The method as claimed in claim 1, wherein reaction time for chlorination is 3-4 hours and entrance gauge pressure is higher than 0 and between 0-0.1 MPa.

3. The method as claimed in claim 1, wherein the product is dried in a sealed container through spray drying or high speed centrifugal spray powder drying.

4. The method as claimed in claim 3, wherein said centrifugal spray powder drying is carried out at a top of a tower, its rotational speed is 10000-20000 revolutions per minute, and a mixture chamber with a temperature of 120-160° C. is used to nebulize the product of the reaction into small particles, and the chlorinated rubber and the solvent are recovered.

5. The method as claimed in claim 1, further comprising the steps of
   recovering the solvent in an exhaust gas through condensation,
   absorbing hydrogen chloride by water to turn into hydrochloric acid, and
   adding sodium hydroxide to turn the remaining chlorine into sodium hypochloride.

6. The method as claimed in claim 1, wherein the method is carried out in a sealed system.

* * * * *